(12) United States Patent
Vandewalle et al.

(10) Patent No.: US 7,340,748 B2
(45) Date of Patent: Mar. 4, 2008

(54) AUTOMATIC CLIENT PROXY CONFIGURATION FOR PORTABLE SERVICES

(75) Inventors: Jean-Jacques Vandewalle, Marseilles (FR); Laurent Lagosanto, Marseilles (FR)

(73) Assignee: Gemplus, Gemenos Cedex (FR)

( * ) Notice: Subject to any disclaimer, the term of this patent is extended or adjusted under 35 U.S.C. 154(b) by 1378 days.

(21) Appl. No.: 09/740,986

(22) Filed: Dec. 21, 2000

(65) Prior Publication Data

US 2002/0082847 A1 Jun. 27, 2002

(51) Int. Cl.
*G06F 3/00* (2006.01)
*G06F 9/44* (2006.01)
*G06F 6/46* (2006.01)
*G06F 13/00* (2006.01)
*G06F 15/16* (2006.01)
*H04L 9/00* (2006.01)

(52) U.S. Cl. .................... 719/330; 719/328; 719/329; 709/227; 709/228; 709/229; 710/8; 710/11; 713/172

(58) Field of Classification Search ............... 719/310, 719/313, 328–330; 235/492, 493; 380/25; 713/172, 201; 709/227–237; 710/8, 11
See application file for complete search history.

(56) References Cited

U.S. PATENT DOCUMENTS

| | | | | |
|---|---|---|---|---|
| 5,513,127 A | * | 4/1996 | Gard et al. | ................ 364/514 |
| 6,009,464 A | * | 12/1999 | Hamilton et al. | ........... 709/219 |
| 6,279,047 B1 | * | 8/2001 | Bublitz et al. | ................ 710/11 |
| 6,393,497 B1 | * | 5/2002 | Arnold et al. | ............. 719/330 |
| 6,542,908 B1 | * | 4/2003 | Ims | ........................... 707/204 |
| 6,938,263 B2 | * | 8/2005 | Wollrath et al. | ........... 719/330 |
| 7,020,696 B1 | * | 3/2006 | Perry et al. | ................ 709/223 |

* cited by examiner

*Primary Examiner*—William Thomson
*Assistant Examiner*—Qing-Yuan Wu
(74) *Attorney, Agent, or Firm*—Buchanan Ingersoll & Rooney, PC

(57) ABSTRACT

In a distributed computing system which employs smart cards to provide services, the need for a fixed mapping between methods that can be invoked from a card application and APDU messages is avoided. A card skeleton provides a decoding table to a client proxy when a connection is established between a card and a terminal. With the information provided from the skeleton, the proxy dynamically maps methods to APDU messages, for communication during a given session. As a result, if the on-card application is enhanced to provide new methods, its corresponding skeleton is upgraded to recognize those methods. When the card is connected to a terminal, the updated information is provided to the proxy at the terminal, to enable the user to access the enhanced features of the application.

16 Claims, 4 Drawing Sheets

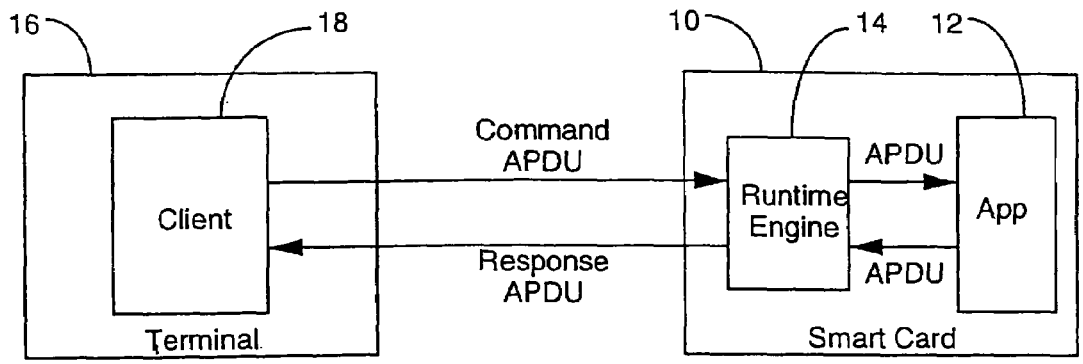
Fig. 1
PRIOR ART
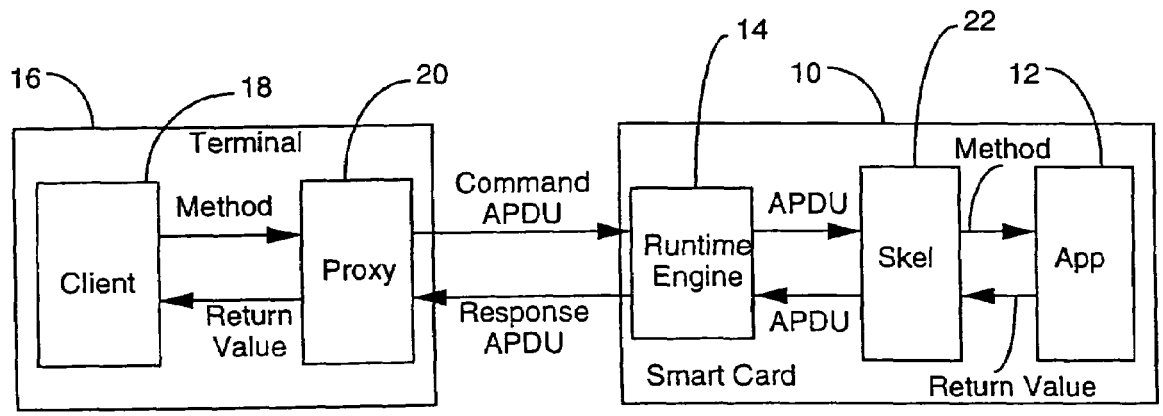
Fig. 2
PRIOR ART
| Method  | APDU |
|---------|------|
| hash(m) | 01   |
| hash(n) | 02   |
| hash(o) | 03   |
Fig. 5a
PRIOR ART
| Method  | APDU |
|---------|------|
| hash(l) | 01   |
| hash(m) | 02   |
| hash(n) | 03   |
| hash(o) | 04   |
Fig. 5b

AUTOMATIC CLIENT PROXY CONFIGURATION FOR PORTABLE SERVICES

FIELD OF THE INVENTION

The present invention is generally directed to portable electronic devices that are capable of executing applications, such as integrated circuit cards, commonly known as "smart cards," PDAs, mobile telephones, and the like. More particularly, the invention is directed to the use of such devices for hosting services in a distributed computing system.

BACKGROUND OF THE INVENTION

As the use of portable electronic devices with integrated microprocessors becomes more widespread, and the technology pertaining to them advances, the amount and variety of information contained in such devices continues to grow, thereby expanding the potential applications for them. In this regard, one particularly interesting application constitutes the use of these devices, such as smart cards, PDAs, mobile telephones, portable devices which contain a Java Virtual machine, etc., as hosts for services in a distributed computing system. In this context, the device stores one or more application programs, e.g., applets in the Java programming language. Each such application has a corresponding client program that communicates with the application stored on the device. Typically, the client program might be stored in a terminal in which the device is inserted, or with which the device otherwise communicates. The client programs and device applications exchange messages with one another, and thereby permit a user at the terminal to employ the services provided by the applications on the device.

Typically, in a distributed computing environment, the client and server portions of an application communicate with one another by means of a predefined set of semantics. One example of such a semantic is a procedure call. Another example of a semantic, in an object-oriented programming environment, is a remote method invocation (RMI). In the context of this latter semantic, the functions, or methods, that can be performed by the server program are published, e.g. through an application programming interface, and the client program interacts with the server program by invoking these methods, and providing any parameters that are associated with the invocation. The server program performs the operation that was requested by the client, and returns a result. This protocol facilitates the development of new client programs, since the program developer need only be aware of the published methods for the server program, and write appropriate calls to invoke those methods.

When using a portable electronic device as a host for distributed services, the device may be required to communicate with the client by means of a specific protocol. In the context of a smart card, for instance, the card and the terminal must communicate with one another in accordance with the standards that are applicable to smart cards. Specifically, ISO/IEC 7816-4 specifies that the card and the terminal communicate with a message structure known as the application protocol data unit (APDU). Messages are exchanged as a command and response pair. In the development of applications for the smart card environment, therefore, the program developer was required to be familiar with this message structure, and incorporate code into the program which conforms to the applicable protocol. For instance, the software on the smart card had to include program code which operated to decode command APDUs and encode response APDUs. On the terminal side of the application, the software had to include program code which performed the corresponding inverse operations. Similarly, other types of portable devices may have specific requirements regarding message structure. Consequently, the development of application programs that were designed to operate on such devices was quite complex.

To alleviate this burden in the development of applications for devices with specific communication requirements, semantic frameworks have been proposed. For instance, an RMI framework for smart cards enables programmers to deal with the card applications at the level of method invocations, and not concern themselves with the APDU message passing mechanism. In essence, this result is accomplished by the use of a client proxy at the terminal side of the system. When the client program invokes a method, this invocation is presented to the proxy. The proxy converts the method into the appropriate APDU message, which is then transmitted to the card. At the card, a skeleton program performs the inverse function of the proxy, and transforms the received APDU messages back into the appropriate method calls. These calls are then presented to the on-card application, which returns a corresponding result.

To facilitate the generation of the client proxy and the card skeleton in the Java programming language developed by Sun Microsystems, a programming tool such as a Stub Generator can be made available to programmers. In the context of smart cards, for example, a Stub Generator which is adapted to a subset of Java that is executed on a smart card, known as Java Card, can be employed. In the development of a service that is to be available from a smart card, the programmer develops the implementation of that service, namely, the actual steps of the program that perform the service, as well as an interface which defines entry points of the application on the card, i.e. the list of methods that are available from the implementation. The Stub Generator tool that is adapted to Java Card then generates the client proxy and the card skeleton from the definitions provided via the interface, to provide appropriate conversions between the published methods and corresponding APDU messages. The card application, which consists of the implementation code, the interface and the card skeleton, is then installed on the card, and client programs are developed which communicate with the client proxy to invoke the methods available through the card service.

The use of the client proxy and card skeleton to facilitate the transport level communications between the terminal and the card provides a number of advantages. First, the card applications can be written in a known language, e.g. the Java programming language. The proxy and skeleton make the APDU protocol transparent to the operation of the program. Consequently, the program developer is not required to have any knowledge of this protocol. As a result, a portable service provider such as a smart card, a PDA, etc., can be readily integrated into a distributed computing model, rather than having to be treated as a special device.

One limitation that has been heretofore associated with the use of the proxy and skeleton to provide a layer of abstraction between the card service application and the APDU messaging protocol is the fact that it restricts the flexibility of the application once the skeleton-proxy pair has been generated. More particularly, while the co-development of the proxy and the skeleton, for example by means of the Stub Generator, ensures compatibility between them, such compatibility only exists as long as they remain static.

However, if the application is subject to ongoing development, enhanced or upgraded versions of a card application may include additional methods that can be invoked by clients, resulting in the publication of a new interface. Consequently, a new skeleton must be generated, to decode APDU messages that relate to the newly-available methods that can be invoked. However, the new skeleton may not be compatible with client proxies that were developed for earlier versions of the application. For instance, the newly developed skeleton may provide a mapping between APDU messages and invokable methods which is different from that of the original proxy and skeleton. As a result, a new proxy will have to be provided, to communicate with this new skeleton. The on-card application will not be able to be used at terminals which employ the original proxy, and vice versa.

As one solution to this type of problem, it is possible to employ an approach in which the generation of the proxy and skeleton must always occur together, to ensure compatibility between them. However, this approach is not practical in an environment where the card application continues to evolve. Each time new functionality is added to the card service, a new proxy-skeleton pair would have to be generated, and the new proxy would have to be deployed to all of the existing terminals which are designed to work with the application. Thus, even if the client programs are not changed, the proxies must still be updated at each of these locations.

As an alternative solution, it is possible to establish a universal mapping between a particular APDU message and a method that is to be invoked with that message. Again, however, such a solution can prove to be impractical. First, it is quite costly in the sense that the length of each individual APDU message would have to be relatively long, on the order of 4-8 bytes, to provide a sufficient number of unique messages that could accommodate all possible methods. Furthermore, it would require a common agreement among all developers of application programs for smart cards, and would have to be language independent. Finally, because of the potentially large number of methods, a large amount of memory would be required in the card to store the mapping between such methods and their corresponding APDU messages.

SUMMARY OF THE INVENTION

In accordance with the present invention, the need for a fixed mapping between invokable methods and predefined message formats, e.g. APDU messages, is avoided by means of a mechanism in which the portable device provides a decoding table to a client proxy when a connection is established between the device and a terminal. With the information provided from the device, the proxy dynamically maps methods to appropriate messages, for communication during a given session. As a result, if the device application is enhanced to provide new methods, its corresponding skeleton is upgraded to recognize those methods. When the device is connected to a terminal, the updated information is provided to the proxy at the terminal, to enable the user to access the enhanced features of the application. At the same time, however, if a device with an older version of the application is connected to the terminal, it can still be used, since it may provide a decoding table that corresponds to the features that its version of the application implements, or a default table can be used which provides the mapping for the basic functions of the application. As a result, a number of different versions of an application can be employed in a distributed computing environment without the need to deploy an updated proxy each time a new version is released.

Further features of the invention, and the advantages provided thereby, are explained in detail hereinafter with reference to exemplary embodiments of the invention illustrated in the accompanying drawings.

BRIEF DESCRIPTION OF THE DRAWINGS

FIG. 1 is a general block diagram of the interaction between a client program in a terminal and an application program that is resident on a smart card;

FIG. 2 is a block diagram of the interaction between a terminal and a smart card which employs the RMI framework;

FIGS. 5a and 5b are exemplary decoding tables that correspond to the situations illustrated in FIGS. 3 and 4, respectively.

DETAILED DESCRIPTION

Figure 3:
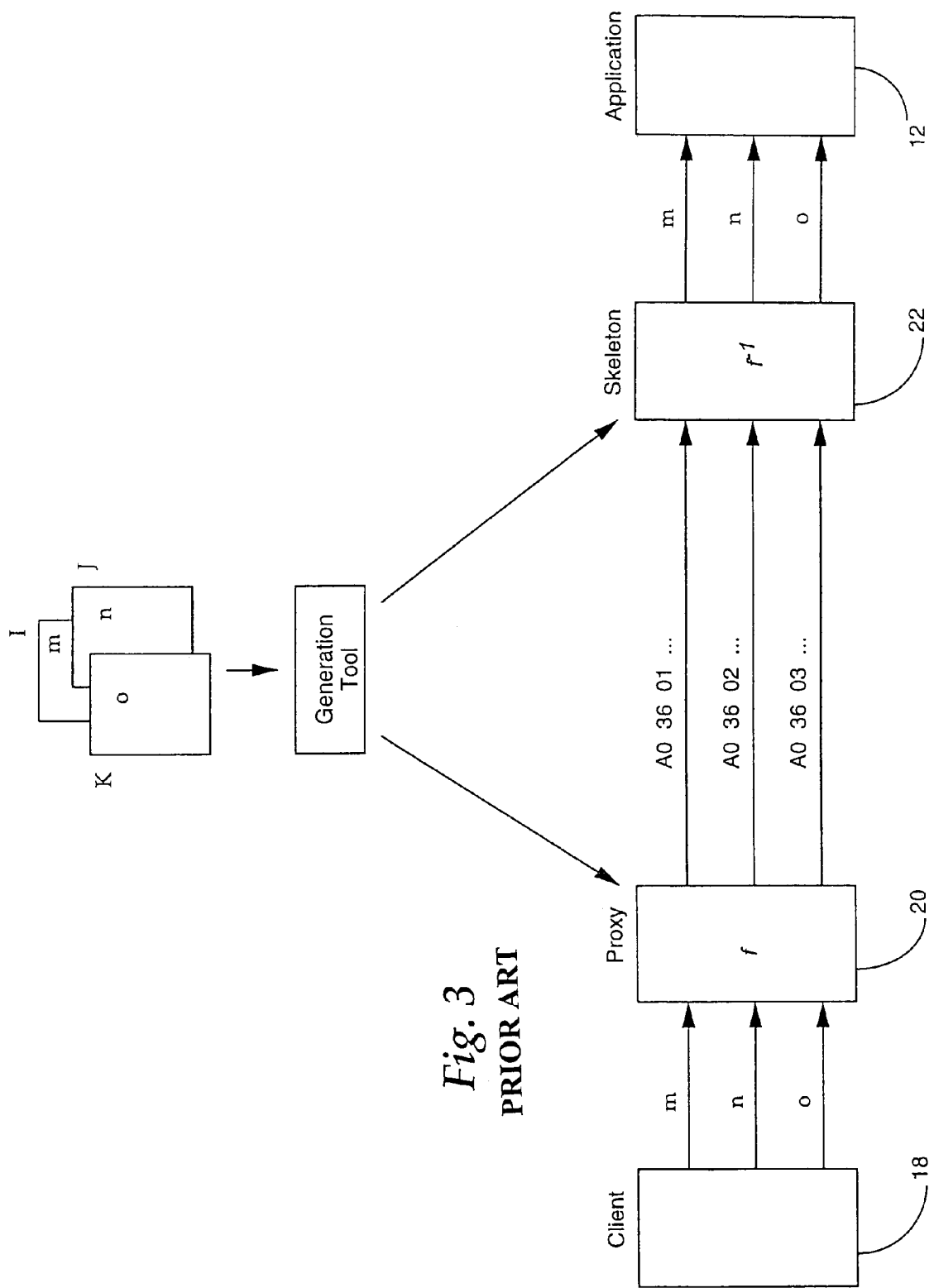
FIG. 3 is a more detailed block diagram of the messages that are exchanged between the client program and the card application in accordance with the RMI framework.

In general, the present invention is directed to a technique which enables two different processing environments to communicate with one another using high-level messages, without the need to take into account communication protocol formats. The two processing environments can be present on the same machine, e.g. two different applications that communicate with one another using messages, or could be widely separated from one another in a distributed computing system. To facilitate an understanding of the present invention, it is described hereinafter with reference to specific implementations thereof. In particular, references are made to embodiments of the invention in which an application which provides services to a user is implemented as a Java applet that is stored on a smart card, and employs remote method invocation (RMI) from a client to execute its functionality. It will be appreciated, however, that the practical applications of the invention are not limited to this particular embodiment. Rather, the principles which underlie the invention can be employed in connection with other types of semantics, as well as in a variety of different embodiments in which a device having application processing capabilities is used to provide services to a client.

FIG. 1 is a block diagram of the general process that occurs when a smart card, or similar type of portable device with application processing capabilities, such as a personal digital assistant (PDA), or a mobile telephone, is employed in a distributed computing environment to provide services. One example of such a service is a bank account application, which may enable an authorized holder of the device to check an account balance, make a deposit to the account, and/or withdraw funds from the account. Stored on the device 10 is an application 12 which provides these types of services. If the application is written in the Java programming language, for example, it can be in the form of an applet that operates in conjunction with a Java Card runtime engine 14, which also executes on the device.

The device 10 is connected to a terminal 16 for communication therewith. The communication between the device and the terminal may be carried out by means of physical contact between the device and in the terminal. Alternatively, the communication may take place in a contactless, i.e. wireless, manner. A client application 18 is stored at the terminal, and exchanges messages with the device application 12 to provide services to a user. For example, if the client program relates to the bank account application, it may display a suitable interface to the user which enables the user to provide input relating to account balances, deposits and withdrawals.

In the embodiment illustrated in FIG. 1, the client program 18 communicates directly with the device application 12 by means of messages that conform to the standards for communication between that device and a terminal. If the device is a smart card, for example, these messages comprise APDU command and response messages. Thus, for example, if the user enters a request to obtain an account balance, the client program 18 generates a command APDU message which is received by the runtime engine 14. The runtime engine recognizes the message as one that pertains to the bank account application, and therefore forwards the APDU message to the application 12, with a command to process it. The application 12 responds to the message by returning a value, in this case the current account balance, in the form of an APDU response message. The runtime engine 14 recognizes this message as a response to the message received from the terminal, and therefore forwards it to the terminal as an APDU message. Upon receipt, the client program 18 decodes the APDU message to obtain the account balance, which it then displays to the user.

FIG. 2 is a block diagram illustrating an alternative implementation which employs a framework for a predefined set of programming semantics to provide a level of abstraction between the client/card application interaction and the low-level messaging protocol. For instance, the predefined set of semantics could be remote method invocation (RMI). In this implementation, the client program 18 issues a call which invokes a method that is available through the device application 12. This call is not transmitted directly to the device 10. Rather, it is provided to a client proxy 20, which encodes the method into an appropriate form. Referring again to the example where the device is a smart card, the call is converted into an APDU command message. This APDU message is transmitted to the card, where it is received by the runtime engine 14. Upon recognizing the message as one which is intended for the card application 12, the runtime engine provides it to a card skeleton 22, which decodes the APDU message in an inverse manner from the encoding that was employed in the client proxy 20. The decoded message is then forwarded to the card application 12 as a request to invoke a method.

Upon processing the request from the client, the card application 12 returns a value to the card skeleton 22. The skeleton converts this value into an APDU response message, which is transmitted to the terminal, via the runtime engine. At the terminal, the client proxy 20 receives the APDU response message, and decodes it into the value returned by the card application 12, which is then provided to the client program 18.

FIG. 3 provides a more detailed illustration of the relationship between the client program 18, the client proxy 20, the card skeleton 22 and the card application 12. The card application has a set of associated interfaces, which, in the illustrated example, are labeled I, J and K. Each interface specifies one or more methods that are implemented by the card application 12. In the illustrated example, the methods which can be implemented by the application are labeled m, n and o, and are respectively defined by the interfaces I, J and K. These methods are referenced by the client program 18, to invoke services from the card application 12.

The methods defined by the set of interfaces are used to construct a mapping between these methods and APDU messages. The proxy 20 encodes methods invoked by the client program 18 into corresponding APDU command messages, and the card skeleton 22 decodes the APDU messages back to the corresponding methods. In the illustrated example, therefore, the method m is mapped to the APDU message (A0 36 01 . . . ), the method n is mapped to the APDU message (A0 36 02 . . . ), and the method o is mapped to the APDU message (A0 36 03 . . . ). The client proxy 20 and the card skeleton 22 which perform these mappings can be automatically generated by a program generation tool, such as a Stub Generator adapted to Java Card. The transfer function $f^1$ for the card skeleton is the inverse of the transfer function f for the card proxy.

In a situation where the client proxy and the card skeleton are generated at the same time, as in the case where a suitable program generation tool is employed, assurance is provided that the proxy and the skeleton are compatible. As long as the application 12, the proxy 20 and the skeleton 22 remain static, the inverse relationship of their transfer functions will hold true, to provide reliable mapping between the methods and the APDU messages.

Figure 4:
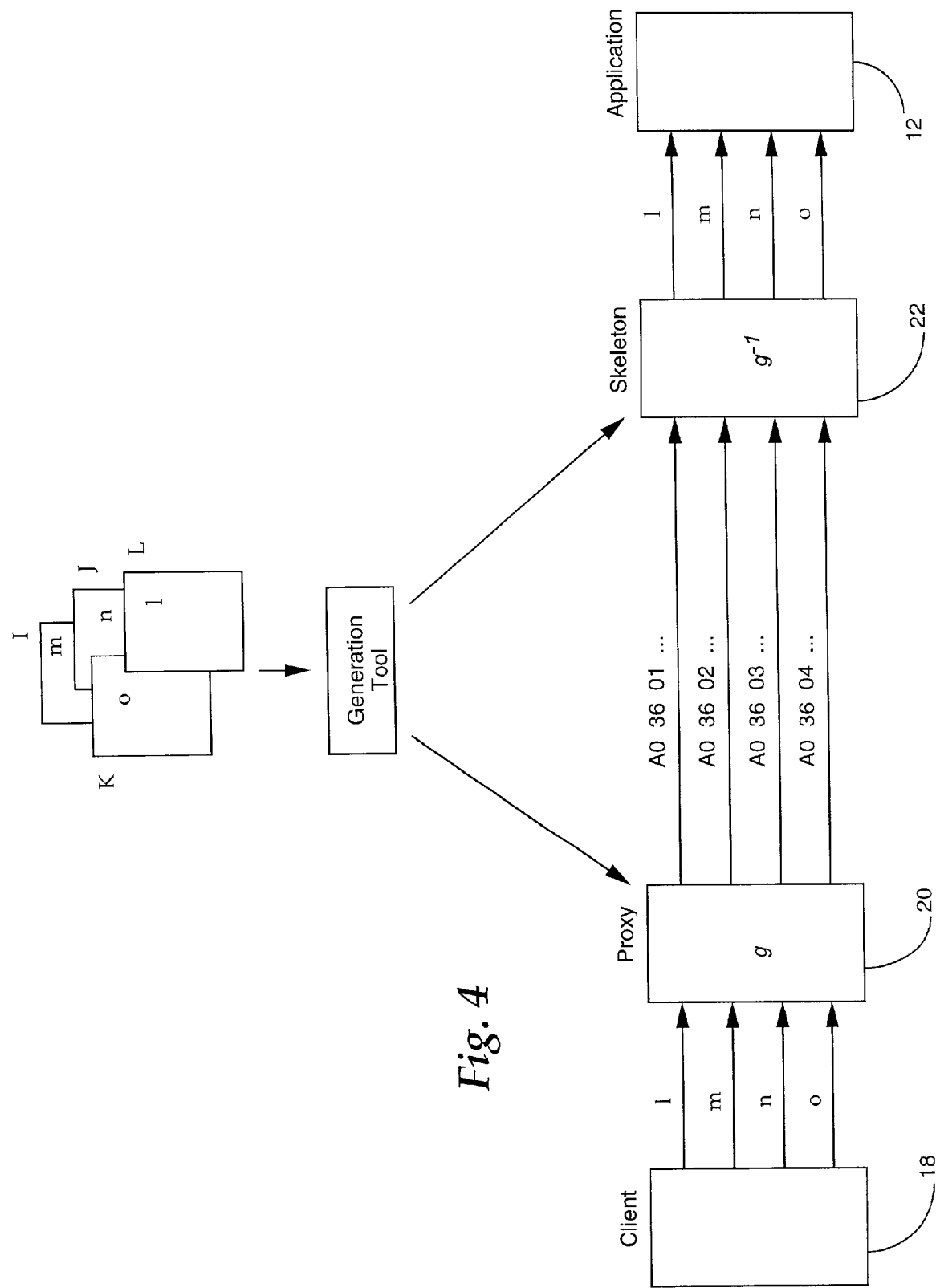
FIG. 4 is a block diagram similar to FIG. 3, illustrating an enhanced version of the card application.

The present invention is particularly directed to the situation in which the skeleton and/or the client proxy do not remain static. For example, the card application 12 may be one which is enhanced over time, to provide additional services to the end user. These additional services may be accessed by invoking new methods that are incorporated into the enhanced version of the application. FIG. 4 illustrates such an example, in which a new interface L defines a method l that is implemented by the enhanced version of the application. In order to utilize the services that are associated with the new method 1, a new proxy-skeleton pair is generated. In this case, the method l is mapped to the APDU message (A0 36 01 . . . ), the method m is mapped to the message (A0 36 02 . . . ), etc. Consequently, the transfer functions g and $g^{-1}$ of the new proxy and skeleton are different from those of the earlier version. In this type of situation, it becomes necessary to deploy the new proxy to all of the terminals that are intended to provide the services of the enhanced application 12 to the user. In many cases, however, it is not practical to effect such dissemination of the proxy, at least within a short period of time. Consequently, a user may attempt to use a card having the enhanced program in a terminal which contains the old proxy. In this situation, if the client program issues a call to invoke the method m, for example to obtain an account balance, the older proxy will encode this method to the message unit (A0 36 01 . . . ). When this message is received in the card which contains the updated skeleton, it will be decoded as a request to invoke the method l. Consequently, the value that is returned by the enhanced version of the card application will not correspond to the request made by the user, i.e. to obtain the account balance.

In accordance with the present invention, this type of problem is overcome by dynamically constructing the mapping between invocable methods and APDU messages in the proxy during a session involving an application. By dynamically constructing the mappings, rather than storing a static structure in the proxy, compatibility between the proxy and the skeleton is maintained at all times.

In one embodiment of the invention, the dynamic construction of the mapping is carried out by providing a table from the skeleton to the proxy, which identifies the manner in which the skeleton decodes APDU command messages into corresponding methods. FIG. 5a illustrates one table which can be employed in connection with the example of FIG. 3. This table includes a first column which contains an identifier for each of the published methods of an application, and a second column containing relevant information pertaining to the corresponding APDU messages. In the illustrated example, the identifiers in the first column comprise hash values that are computed from each of the respective methods to thereby minimize the size of the table. The hash values can be computed according to any desirable hashing algorithm. The second column of the table contains only those portions of the APDU message which are unique to each of the corresponding methods that they represent. More particularly, a command APDU message that conforms to the relevant ISO standard includes a mandatory 4-byte header. As illustrated in the example of FIG. 3, the first two bytes of the header might be the same for all APDU command messages that are used to invoke a method, as represented by the values A0 and 36. The third byte of the header is a parameter value which can be used to identify the specific method to be invoked. Hence, in the example of FIG. 5a, the value of the third byte in the header appears in the decoding table.

When the application program is enhanced to provide additional methods, a new skeleton is generated, thereby establishing a new decoding table. One possible decoding table for the example of FIG. 4, in which the additional method l can be evoked, is illustrated in FIG. 5b.

In a preferred embodiment of the invention, the decoding table is stored on the smart card 10, and provided to the proxy 20 when a session is initiated between the card application and the client. The table can be stored on the card at the time that the application is loaded onto the card. Alternatively, the skeleton can dynamically construct the table by inspection of the application's interface to determine the published methods.

Figure 6:
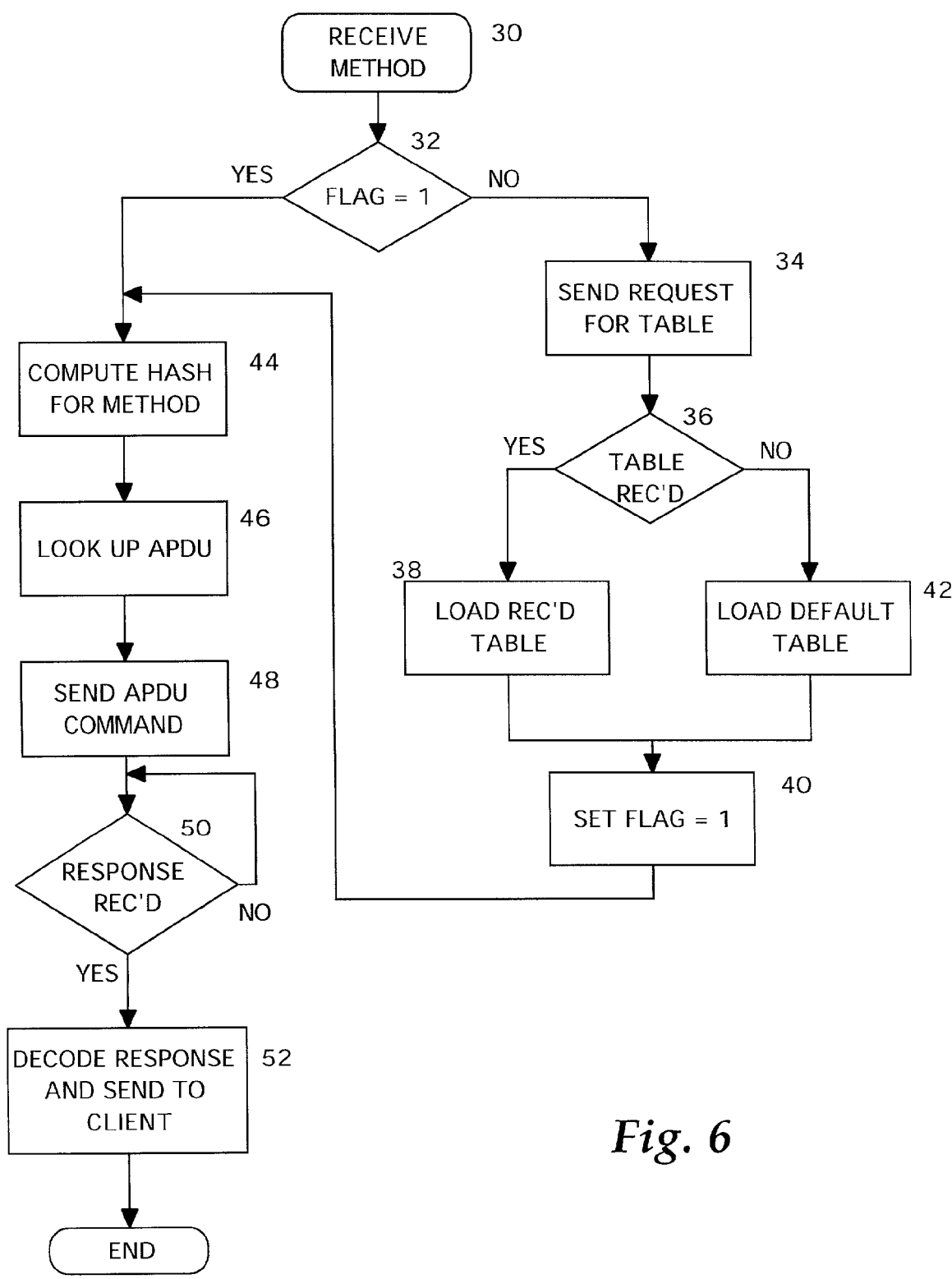
FIG. 6 is a flow chart of the operation of the client proxy to encode methods received from the client.

In conformance with the RMI framework, the retrieval of the decoding table by the client proxy is transparent to the client itself. The mechanism for providing the decoding table to the proxy can be implemented in a variety of ways. For example, if a terminal is dedicated to a single application, the decoding table can be downloaded from the card to the proxy in the terminal as part of the initialization routine that is carried out when the card and the terminal first begin to communicate with one another. In a multi-application environment, it is more preferable to provide the table for a given application to its associated proxy only when that application is being used. FIG. 6 is a flowchart which illustrates one process that can be employed to provide the proxy with the decoding table. In this process, the table is provided upon the first invocation of a method associated with a given application.

At step 30, the client proxy receives a request from the client program 18, to invoke a method. Upon receiving the request, at step 32 the proxy checks the status of a flag which indicates whether the decoding table has been received. If the status of the flag indicates that the decoding table has not been received, e.g. the flag has a value of zero, an appropriate APDU message is sent to the card at step 34, requesting the decoding table. The APDU command that is used to retrieve the table from the skeleton can be one that is common to all applications which are based upon the RMI framework. A check is made at step 36 whether the table has been received from the card. If so, the table is loaded at step 38 and the flag is set at step 40.

In some situations it may be the case that a decoding table cannot be retrieved from the card. For example, if an older card having a static skeleton is inserted into the terminal, it may not be able to respond to the APDU message requesting transfer of the decoding table. In a case of this type where the card cannot provide the decoding table at step 36, the proxy can employ a default encoding rule to construct a table which determines the mapping between invoked methods and APDU command messages. For example, the encoding rule can be the same rule that is employed by the tool that is used to generate the proxy and skeleton, e.g. the Stub Generator for the Java Card programming environment. Alternatively, a default table may be stored with the proxy, to be employed when the table cannot be retrieved from the skeleton.

Once a decoding table is retrieved or constructed by the proxy, it can be used to dynamically determine the mapping between the methods invoked by the client and the appropriate APDU messages. Each time a request to invoke a method is received from the client, the proxy computes the hash value for that method at step 44, and uses this value as an index into the decoding table, at step 46, to determine the appropriate parameter value to be incorporated into the APDU command message that is sent to the card. This command message is sent to the card by the proxy at step 48. The proxy then awaits receipt of the response APDU at step 50. Once the response APDU is received, the proxy decodes it at step 52, and presents it to the client as the return value resulting from the invocation of the method.

As a further advantage of this approach, if an enhanced card is inserted into a terminal with an older version of the client that is not aware of the enhanced features, the dynamically constructed mapping can still be employed to access those features about which the client is aware. Whenever a method is invoked by the client, its hash value enables the correct message to be retrieved from the table, so that the older version of the client which is limited to certain methods can interact with the enhanced application and employ those features of which it is aware.

From the foregoing, it can be seen that the present invention provides a mechanism that provides flexibility in the use and evolution of card-based applications in a distributed computing environment. By dynamically constructing the mapping between methods and APDU messages, this mechanism avoids the limitations associated with static proxy-skeleton structures. Consequently, as application are upgraded so that they are capable of processing additional methods, the ability of the proxy to adequately interpret these methods is maintained, without having to deploy a new proxy to each terminal. Furthermore, this mechanism is independent of the implementation language and the interfaces of the proxy and the skeleton, and therefore can be employed on a universal basis. As a result, both old and new proxies can be employed with either older or newer versions of the application. In other words, any combination of proxy and application can be made to work with one another.

It will be appreciated by those of ordinary skill in the art that the present invention can be embodied in other forms without departing from the spirit or essential characteristics thereof. For example, in the foregoing embodiment, the decoding table is provided to the proxy from the card itself. However, the card need not be the source of the table. For instance, if the terminal is connected to a communications network, the decoding tables for various series of cards can be stored on a server that is connected to the communications network. Once the terminal has established communication with the card, the proxy can determine the type of card, and/or the particular versions of the applications on the card. Then, as needed, it can download the appropriate decoding tables from the server.

Likewise, while the illustrated embodiments of the invention relate to a distributed computing system, in which the application and the client reside on different devices, the invention is generally applicable to any situation in which two different processing environments communicate with one another using high level semantics, such as remote method invocation or remote procedure calls. Thus, for example, the invention can be used to enable two application programs on the same machine to interact with one another, without having to take into account the particular low-level messaging protocol that is employed on the machine to transport messages, such as APDU.

The presently disclosed embodiments are therefore considered in all respects to be illustrative, and not restrictive. The scope of the invention is indicated by the appended claims, rather than the foregoing description, and all changes that come within the meaning and range of equivalents thereof are intended to be embraced therein.

What is claimed is:

1. A method for communicating a request to invoke a method from a client program that is executing on a terminal to an application program that is executing on a smart card, comprising the steps of:
   obtaining a decoding table at the terminal which identifies a mapping that is performed on the smart card between application protocol data unit (APDU) command messages and methods that can be implemented by the application program;
   reading from said table at least one parameter of an APDU message which is mapped to the request from the client program;
   generating an APDU command message based upon the parameter read from the table; and
   transmitting the generated APDU command message to the smart card.

2. The method of claim 1, wherein said table is obtained from the smart card.

3. The method of claim 2, further including the steps of determining whether the smart card is capable of providing the decoding table, and loading a default table at the terminal if the smart card is not able to provide the decoding table.

4. The method of claim 3, wherein said default table is generated at the terminal in accordance with a default decoding rule.

5. The method of claim 1, wherein said table is obtained in response to an initial request that is received from the client.

6. The method of claim 5, further including the step of sending a message to the smart card to provide the table in response to receipt of the initial request.

7. A method for communicating a high-level message from a client program to an application program by a low-level messaging protocol, comprising the steps of:
   requesting that a decoding table be provided from the application program executing on a computing device to the client program executing on a computing device which identifies a mapping that is performed between low-level messages and high-level messages that are recognized by the application program;
   determining whether the device on which the application program is executing is capable of providing the decoding table;
   loading the decoding table from the device on which the application program is executing, if said device is capable of providing the decoding table;
   loading a default decoding table to the location of the client program if the device is determined not to be able to provide the decoding table;
   reading from the loaded table at least one parameter of a low-level message which is mapped to a request from the client program;
   generating a low-level message based upon the parameter read from the table; and
   transmitting the generated low-level message to the application program.

8. The method of claim 7, wherein said default table is generated at the location of the client program in accordance with a default decoding rule.

9. The method of claim 7, wherein said table is provided in response to an initial request that is received from the client program.

10. The method of claim 9, further including the step of sending a message to the application program to provide the table in response to receipt of the initial request.

11. A distributed computing system, comprising:
    a portable service provider containing an application program that operates in accordance with a set of semantics for message processing, and an intermediary program that receives messages that conform to a predetermined communication protocol and converts said messages into requests that are based upon said set of semantics;
    a client program executing on a computing device which generates requests to said application program;
    a proxy for said client program which converts said generated requests into messages that conform to said predetermined communication protocol, for transmission to said portable service provider; and
    means for providing to said proxy a decoding table that identifies a mapping that is performed on the portable service provider between said messages and semantics that are recognized by the application program.

12. The system of claim 11 wherein said semantics comprise methods that can be remotely invoked on the application program.

13. The system of claim 11 wherein said semantics comprise remote procedure calls that can be made to the application program.

14. The system of claim 11 wherein said portable service provider is a smart card, and said messages comprise application protocol data unit (APDU) messages.

15. The system of claim 11 wherein said providing means is located on said portable service provider.

16. The system of claim 11 wherein said providing means is located on a device which is separate from said portable service provider.

* * * * *